United States Patent
Itoh et al.

(10) Patent No.: US 9,266,970 B2
(45) Date of Patent: Feb. 23, 2016

(54) HYDROXYPROPYLMETHYLCELLULOSE HAVING HIGH THERMAL GEL STRENGTH, METHOD FOR PRODUCING THE SAME AND FOOD COMPRISING THE HYDROXYPROPYLMETHYLCELLULOSE

(71) Applicant: Shin-Etsu Chemical Co., Ltd., Tokyo (JP)

(72) Inventors: Rumiko Itoh, Joetsu (JP); Mitsuo Narita, Joetsu (JP); Miyuki Fukasawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 170 days.

(21) Appl. No.: 13/875,819

(22) Filed: May 2, 2013

(65) Prior Publication Data

US 2013/0245249 A1   Sep. 19, 2013

Related U.S. Application Data

(62) Division of application No. 12/959,659, filed on Dec. 3, 2010, now abandoned.

(30) Foreign Application Priority Data

Dec. 15, 2009 (JP) .................................. 2009-283923
Jun. 25, 2010 (JP) .................................. 2010-144889

(51) Int. Cl.

| C08B 11/193 | (2006.01) |
|---|---|
| A21D 2/18 | (2006.01) |
| A21D 13/00 | (2006.01) |
| A21D 13/04 | (2006.01) |
| A21D 13/06 | (2006.01) |
| A23C 20/02 | (2006.01) |
| A23L 1/0534 | (2006.01) |
| A23L 1/187 | (2006.01) |
| A23L 1/216 | (2006.01) |
| A23L 1/217 | (2006.01) |
| C08B 1/08 | (2006.01) |
| C08L 1/28 | (2006.01) |

(52) U.S. Cl.

CPC .............. *C08B 11/193* (2013.01); *A21D 2/188* (2013.01); *A21D 13/0041* (2013.01); *A21D 13/04* (2013.01); *A21D 13/066* (2013.01); *A23C 20/025* (2013.01); *A23L 1/0534* (2013.01); *A23L 1/1875* (2013.01); *A23L 1/217* (2013.01); *A23L 1/2161* (2013.01); *C08B 1/08* (2013.01); *C08L 1/284* (2013.01)

(58) Field of Classification Search

CPC ...................................................... C08B 11/193
USPC ............................................................ 536/91
See application file for complete search history.

(56) References Cited

U.S. PATENT DOCUMENTS

| 4,997,669 A | 3/1991 | Yokoyama et al. |
|---|---|---|
| 7,005,515 B2 | 2/2006 | Schneider et al. |
| 7,402,668 B2 | 7/2008 | Dannhorn et al. |
| 2003/0065165 A1 | 4/2003 | Dannhorn et al. |
| 2004/0102625 A1 | 5/2004 | Schneider et al. |
| 2005/0255206 A1 | 11/2005 | Fukasawa et al. |
| 2006/0088647 A1 | 4/2006 | Kadan |
| 2007/0149772 A1 | 6/2007 | Narita et al. |
| 2008/0262216 A1 | 10/2008 | Hayakawa et al. |
| 2009/0165971 A1 | 7/2009 | Narita |
| 2011/0077391 A1 | 3/2011 | Hayakawa et al. |

FOREIGN PATENT DOCUMENTS

| CN | 1398900 A | 2/2003 |
|---|---|---|
| CN | 1507453 A | 6/2004 |
| CN | 1990505 A | 7/2007 |
| CN | 101289515 A | 10/2008 |
| CN | 101469033 A | 7/2009 |
| EP | 1 983 004 A1 | 10/2008 |
| JP | 10-80252 A | 3/1989 |
| JP | 2002-51758 A | 2/2002 |
| JP | 2003-096102 A | 4/2003 |
| JP | 2005-348721 A | 12/2005 |
| JP | 2008-285673 A | 11/2008 |

OTHER PUBLICATIONS

European Search Report for Application No. EP 10 19 1606 dated Apr. 28, 2011.
Office Action for Chinese Application No. 201010578677.5 dated Jul. 4, 2012.
Office Action for Japanese Application No. 2014-053527 dated Feb. 3, 2015.

*Primary Examiner* — Scarlett Goon
(74) *Attorney, Agent, or Firm* — Alston & Bird LLP

(57) ABSTRACT

Provided is hydroxypropylmethylcellulose having a high thermal gelation temperature and a high thermal gel strength and a method for producing the same and a food comprising the hydroxypropylmethylcellulose. More specifically, provided is hydroxypropylmethylcellulose having an average substitution degree of a methoxy group of 1.0 to 2.0 per glucose unit, an average substitution degree of a hydroxypropoxy group of 0.05 to 0.4 per glucose unit, and a A/B value of 0.305 or greater wherein A represents a substitution degree of a methoxy group directly substituted for a hydroxy group on carbon at position 6 in a glucose unit free from a hydroxypropoxy group-substituted hydroxy group, B represents a substitution degree of a methoxy group per glucose unit, and the A/B represents a value of A divided by B.

15 Claims, No Drawings

HYDROXYPROPYLMETHYLCELLULOSE HAVING HIGH THERMAL GEL STRENGTH, METHOD FOR PRODUCING THE SAME AND FOOD COMPRISING THE HYDROXYPROPYLMETHYLCELLULOSE

CROSS REFERENCE TO RELATED APPLICATIONS

This application is a divisional of U.S. application Ser. No. 12/959,659 filed Dec. 3, 2010, which claims priority to Japanese Patent Application No. 2009-283923, filed on Dec. 15, 2009 and Japanese Patent Application No. 2010-144889, filed on Jun. 25, 2010, the entire contents of which are incorporated herein by reference.

BACKGROUND OF THE INVENTION

1. Field of the Invention

The present invention relates to hydroxypropylmethylcellulose having a high thermal gel strength, a method for producing the same and a food comprising the hydroxypropylmethylcellulose.

2. Description of the Related Art

Cellulose ether capable of thermoreversibly gelating, such as methylcellulose and hydroxypropylmethylcellulose, is used in processed foods. For example, such cellulose ether is known to improve shape retention during heating when added to dry cheese (JP 01-080252A). The cellulose ether, when added with agar to freeze-dried foods such as freeze-dried tofu (bean curd), can produce a food which maintains its shape, even if large, during rehydration and during cooling after rehydration and has an excellent texture (JP 2005-348721A). The cellulose ether, when added to frozen foods, can thermally gelate during food processing or during heat-thawing to retain water, thereby keeping flavor (JP 2002-51758A).

In general, an aqueous methylcellulose solution forms a harder gel by heating than the gel an aqueous hydroxypropylmethylcellulose solution forms. Thus, methylcellulose is more preferable than hydroxypropylmethylcellulose as an additive for improving shape retention by thermal gelation. However, such methylcellulose has the problem that in the preparation of its aqueous solution, the methylcellulose cannot be dissolved completely unless it is temporarily cooled to 15° C. or lower. By contrast, hydroxypropylmethylcellulose can be dissolved in water at room temperature of 25° C. or higher. Thus, development of hydroxypropylmethylcellulose having excellent solubility and thermal gel strength has been demanded because cooling procedures at 15° C. or lower are often difficult to be performed in food preparation.

In general, the thermal gelation temperature of hydroxypropylmethylcellulose is higher than that of methylcellulose. A low thermal gelation temperature can offer rapid gelation during heating, while an excessively low thermal gelation temperature requires much time for returning to a solution state by natural cooling after temporal thermal gelation. For example, a compound having an excessively low thermal gelation temperature is added to heat-processed foods such as croquette, the food textures may deteriorate because the foods remain gelled during eating and are therefore too hard. Thus, a thermal gelation temperature, in addition to thermal gel strength, must also be taken into consideration in adding hydroxypropylmethylcellulose to processed foods for the purpose of exerting thermoreversible gelation effect.

Hydroxyalkylmethylcellulose having a high thermal gel strength is described in JP 2008-285673A. The hydroxyalkylmethylcellulose is produced through the steps of: adding a hydroxyalkyl etherification agent, and reacting the hydroxyalkyl etherification agent with alkali cellulose and then adding a methyl etherification agent to the reaction product; or the step of adding a hydroxyalkyl etherification agent and a methyl etherification agent such that 40% by weight or more of the stoichiometric amount of the methyl etherification agent is unreacted at the point in time when 60% by weight or more of the stoichiometric amount of the hydroxyalkyl etherification agent is reacted. However, this hydroxyalkylmethylcellulose, when used in food application, has been requested to be further improved in terms of thermal gel strength and a thermal gelation temperature.

SUMMARY OF THE INVENTION

The present invention has been achieved in consideration of such circumstances and provides hydroxypropylmethylcellulose having a high thermal gelation temperature and a high thermal gel strength, a method for producing the same and a food comprising the hydroxypropylmethylcellulose.

The present invention provides hydroxypropylmethylcellulose having an average substitution degree of a methoxy group of 1.0 to 2.0 per glucose unit, an average substitution degree of a hydroxypropoxy group of 0.05 to 0.4 per glucose unit, and an A/B value of 0.305 or greater wherein A represents a substitution degree of a methoxy group directly substituted for a hydroxy group on carbon at position 6 in a glucose unit free from a hydroxypropoxy group-substituted hydroxy group, B represents a substitution degree of a methoxy group per glucose unit, and the A/B represents a value of A divided by B.

The present invention also provides a method for producing hydroxypropylmethylcellulose having an average substitution degree of a methoxy group of 1.0 to 2.0 per glucose unit, an average substitution degree of a hydroxypropoxy group (C) of 0.05 to 0.4 per glucose unit, and an A/B value of 0.305 or greater wherein A represents a substitution degree of a methoxy group directly substituted for a hydroxy group on carbon at position 6 in a glucose unit free from a hydroxypropoxy group-substituted hydroxy group, B represents a substitution degree of a methoxy group per glucose unit, and the A/B value represents a value of A divided by B, the method comprising at least the steps of: reacting a pulp with an alkali to obtain an alkali cellulose, and adding a methyl etherification agent and a hydroxypropyl etherification agent to react with the alkali cellulose to obtain hydroxypropylmethylcellulose, wherein addition rates of the methyl etherification agent and the hydroxypropyl etherification agent are adjusted such that a reacted portion of the hydroxypropyl etherification agent becomes less than 50% at the time when a reacted portion of the methyl etherification agent is 50% or more; or such that a reacted portion of the hydroxypropyl etherification becomes less than 30% at the time when a reacted portion of the methyl etherification agent is 30% or more, so as to obtain a C/D value of 0.28 or less wherein C represents the average substitution degree of a hydroxypropoxy group per glucose unit of the hydroxypropylmethylcellulose, D represents the number of moles of the hydroxypropyl etherification agent per glucose unit of the hydroxypropylmethylcellulose, and the C/D value represents a value of C divided by D.

According to the present invention, hydroxypropylmethylcellulose which is easily dissolved at room temperature and has a high thermal gelation temperature and a high thermal gel strength can be obtained. Particularly, use of the hydroxypropylmethylcellulose of the present invention as a food additive can produce a food composition that is excellent in shape retention during cooking under heat.

DETAILED DESCRIPTION OF THE PREFERRED EMBODIMENTS

Hereinafter, the present invention will be described specifically in detail.

The hydroxypropylmethylcellulose of the present invention is a hydroxypropylmethylcellulose having an average substitution degree of a methoxy group of 1.0 to 2.0, preferably 1.3 to 1.6, per glucose unit and an average substitution degree of a hydroxypropoxy group (C) of 0.05 to 0.4, preferably 0.1 to 0.3, more preferably 0.2 to 0.3, per glucose unit. Hydroxypropylmethylcellulose having an average substitution degree of a methoxy group lower than 1.0 or higher than 2.0 is poorly dissolved in water. Hydroxypropylmethylcellulose having an average substitution degree of a hydroxypropoxy group (C) lower than 0.05 requires a dissolution temperature of 25° C. or lower, whereas a hydroxypropylmethylcellulose having an average substitution degree of a hydroxypropoxy group (C) higher than 0.4 has an excessively low strength in a gel state obtained by the heating of its aqueous solution.

These average substitution degrees of a methoxy group and a hydroxypropoxy group can be determined by the analysis method on methylcellulose described in the Japanese Pharmacopoeia, Fifteenth Edition, "Standard Test Method for Methylcellulose" of ASTM D1347-72/USA, and J. G. Cobler et al., "Determination of Alkoxyl Substitution Ether by Gas Chromatography" Talanta, 1962, Vol. 9, pp 473-481. They may be determined by other determination methods such as H-NMR or 13C-NMR methods, in addition to these analysis methods of substitution degrees.

The hydroxypropylmethylcellulose of the present invention is also a hydroxypropylmethylcellulose having an A/B value of 0.305 or greater wherein A represents a substitution degree of a methoxy group directly substituted for a hydroxy group on carbon at position 6 in a glucose unit free from a hydroxypropoxy group-substituted hydroxy group, B represents a substitution degree of a methoxy group per glucose unit of the cellulose, and the A/B value represents a value of A divided by B. Hydroxypropylmethylcellulose having an A/B value less than 0.305 has an insufficient thermal gel strength. The hydroxypropylmethylcellulose of the present invention has an A/B value of preferably 0.37, more preferably 0.35, as the upper limit. Although hydroxypropylmethylcellulose having a larger A/B value can have higher thermal gel strength, such hydroxypropylmethylcellulose may be hardly dissolved at room temperature because the dissolution temperature is decreased to 25° C. or lower.

The substitution degree of a methoxy group (A) directly substituted for a hydroxy group on carbon at position 6 in a glucose unit free from a hydroxypropoxy group-substituted hydroxy group means the total value of: (1) a substitution degree of a methoxy group on carbon at position 6 where, of three replaceable hydroxy groups in the glucose unit, hydroxy groups on carbon at position 2, carbon at position 3, and carbon at position 6 have been substituted by methoxy groups; (2) a substitution degree of a methoxy group on carbon at position 6 where the hydroxy groups on carbon at position 2 and carbon at position 6 have been substituted by methoxy groups and the hydroxy group on carbon at position 3 is unsubstituted; (3) a substitution degree of a methoxy group on carbon at position 6 where the hydroxy groups on carbon at position 3 and carbon at position 6 have been substituted by methoxy groups and the hydroxy group on carbon at position 2 is unsubstituted; and (4) a substitution degree of a methoxy group on carbon at position 6 where the hydroxy group on carbon at position 6 has been substituted by a methoxy group and the hydroxy groups on carbon at position 2 and carbon at position 3 are unsubstituted. Moreover, the substitution degree of a methoxy group (B) per glucose unit of the cellulose means the total value of: (1) a substitution degree of a methoxy group where only methoxy groups have been substituted per glucose unit; (2) a substitution degree of a methoxy group where one glucose contains both methoxy groups and one hydroxypropoxy group; and (3) a substitution degree of a methoxy group where hydroxypropoxy groups have been substituted per glucose unit and the hydroxy group moieties of the hydroxypropoxy groups have further been substituted by methoxy groups.

The substitution degree of a methoxy group (A) directly substituted for a hydroxy group on carbon at position 6 in a glucose unit free from a hydroxypropoxy group-substituted hydroxy group and the substitution degree of a methoxy group (B) per glucose unit of the cellulose can be determined according to the methods as described in Macromolecules, 20, 2413 (1987) and Journal of the Society of Fiber Science and Technology, Japan, 40, T-504 (1984) by hydrolyzing cellulose ether in sulfuric acid, subjecting to neutralization, filtration and purification, and reducing and further acetylating the purified product, and determining substitution degrees based on each detection graph profile identified using a mass spectrometer combined with any of 13C-NMR, liquid chromatography and gas chromatography.

The thermal gelation temperature of the hydroxypropylmethylcellulose of the present invention is preferably 64° C. or higher, more preferably 66° C. or higher, particularly preferably 68° C. or higher. In this context, the thermal gelation temperature means a temperature at which the viscosity of an aqueous 2% by weight hydroxypropylmethylcellulose solution starts to sharply decrease as heated at 1° C./min., i.e., a gelation onset temperature. A low thermal gelation temperature can offer rapid gelation during heating, whereas an excessively low thermal gelation temperature requires much time for returning from the gel to a solution state by natural cooling after temporal thermal gelation. Therefore, the thermal gelation temperature is preferably the temperature described above. The upper limit of the thermal gelation temperature is preferably 75° C. A thermal gelation temperature much higher than this upper limit requires much time for the onset of gelation by heating and may not obtain the intended improvement in shape retention.

The weight-average degree of polymerization of the hydroxypropylmethylcellulose of the present invention is preferably 10 to 5000, more preferably 80 to 4000, particularly preferably 350 to 2000. The weight-average degree of polymerization can be determined according to the molecular weight determination method described in Journal of Polymer Science and Technology, Vol. 39, No. 4, 293-298 (1982) by measuring a weight-average molecular weight by a combined method of gel permeation chromatography and light scattering and dividing the weight-average molecular weight by a molecular weight per unit hydroxypropylmethylcellulose molecule. In this context, for the measurement of the weight-average molecular weight, the kinds or conditions of solvents, temperatures, columns, or wavelengths of a light scattering apparatus, can be appropriately selected without being limited to the conditions described in the above article of Journal of Polymer Science and Technology. The weight-average molecular weight may be determined by ultracentrifugation or conversion from a viscosity-average molecular weight.

Hydroxypropylmethylcellulose having a weight-average degree of polymerization lower than 10 may have insufficient thermal gel strength when used as an additive. Hydroxypropylmethylcellulose having a weight-average degree of polymerization higher than 5000 may have an excessively high viscosity in an aqueous solution thereof and thus be poorly operable. Hydroxypropylmethylcellulose having a higher weight-average degree of polymerization tends to exhibit higher thermal gel strength in an aqueous solution thereof having the same concentration. However, even hydroxypropylmethylcellulose having a low weight-average degree of polymerization can obtain necessary strength by adjusting the concentration of aqueous solution thereof.

The hydroxypropylmethylcellulose of the present invention can be added to a food for the purpose of maintaining shape retention during heating. It can be added in an amount of preferably 0.1 to 5 parts by weight, more preferably 0.3 to 2 parts by weight, with respect to 100 parts by weight of a food. When hydroxypropylmethylcellulose is added in an amount less than 0.1 parts by weight, gel strength may be insufficient. When hydroxypropylmethylcellulose is added in an amount larger than 5 parts by weight, the desired flavor, hardness, or viscosity of a food may not be obtained.

Examples of the food to which the hydroxypropylmethylcellulose of the present invention is added may include foods that require heating at a temperature higher than the thermal gelation temperature of the hydroxypropylmethylcellulose of the present invention and preferably maintain their shapes by virtue of the gelation of the hydroxypropylmethylcellulose during heating; and foods that are desired to have enhanced water retention capability to maintain flavor. Specific examples thereof may include heat-process foods such as fabricated potato, onion rings, croquette, donuts, and bread; and materials for food processing including frozen foods such as fillings and batters that require heating.

Next, a method for producing the hydroxypropylmethylcellulose of the present invention will be described. First, a pulp is alkalized by impregnating a predetermined amount of pulp in an aqueous alkali solution such as an aqueous sodium hydroxide solution to obtain alkali cellulose.

Herein, the pulp used in the present invention is any of those usually serving as materials for cellulose ether such as wood pulp and linter pulp, and all forms of pulp such as powder, sheet and chip forms of pulp can be used. Moreover, the pulp can have a degree of polymerization which is appropriately selected according to the intended viscosity of cellulose ether.

Then, the alkali cellulose is reacted with necessary amounts of a methyl etherification agent such as methyl chloride and a hydroxypropyl etherification agent such as propylene oxide to produce a hydroxypropylmethylcellulose.

Herein, the hydroxypropylmethylcellulose has three replaceable hydroxy groups, where the methyl etherification reaction is generally more likely to occur at hydroxy groups firstly on carbon at position 2, secondly on carbon at position 6, and thirdly on carbon at position 3 in the glucose unit, while the hydroxypropyl etherification is most likely to occur at a hydroxy group on carbon at position 6 in the glucose unit. Thus, the hydroxypropylmethylcellulose having an A/B value of 0.305 or greater, wherein A represents a substitution degree of a methoxy group directly substituted for a hydroxy group on carbon at position 6 in a glucose unit free from a hydroxypropoxy group-substituted hydroxy group, B represents a substitution degree of a methoxy group per glucose unit of the cellulose, and the A/B value represents a value of A divided by B, can be produced by preferentially methylating the hydroxy group on carbon at position 6 through a reaction with the methyl etherification agent preceding to the reaction with the hydroxypropyl etherification agent.

Specifically, to exert the effect of the present invention, a C/D value obtained by dividing C by D, wherein C represents the average substitution degree of a hydroxypropoxy group per glucose unit of the obtained hydroxypropylmethylcellulose, and D represents the number of moles of the hydroxypropyl etherification agent subjected to the reaction per glucose unit of the hydroxypropylmethylcellulose, is set to 0.28 or less, preferably 0.26 or less. The C/D value has a lower limit of preferably 0.15, more preferably 0.20. When the lower limit of the C/D value is less than 0.15, the thermal gel strength may not be improved so that an excessive amount of the hydroxypropyl etherification agent may be used with cost-ineffectiveness.

Herein, D (the number of moles of the hydroxypropyl etherification agent subjected to the reaction per glucose unit of the hydroxypropylmethylcellulose) is a value obtained by dividing the number of moles of the hydroxypropyl etherification agent subjected to the reaction by the number of moles of the glucose unit of the cellulose pulp subjected to the reaction.

The preceding reaction with the methyl etherification agent increases D (the number of moles of the hydroxypropyl etherification agent subjected to the reaction per glucose unit of the hydroxypropylmethylcellulose) because this reaction decreases the etherification reaction efficiency of the competing hydroxypropyl etherification agent. Accordingly, the value (C/D) obtained by dividing C (the average substitution degree of a hydroxypropoxy group per glucose unit of the hydroxypropylmethylcellulose) by D (the number of moles of the hydroxypropyl etherification agent subjected to the reaction per glucose unit of the hydroxypropylmethylcellulose) can be used as an index of the preceding reaction with the methyl etherification agent.

The methyl etherification agent and the hydroxypropyl etherification agent may be added simultaneously, or the methyl etherification agent may be added in advance. The methyl etherification agent or the hydroxypropyl etherification agent is preferably added continuously or appropriately for production such that the reacted portion of the total amount of hydroxypropyl etherification agent becomes less than 50% at the time when the reacted portion of the total amount of methyl etherification agent is 50% or more; or such that the reacted portion of the total amount of hydroxypropyl etherification agent becomes less than 30% at the time when the reacted portion of the total amount of methyl etherification agent is 30% or more. In this context, the reacted portion of the methyl etherification agent means the molar ratio of the amount of the methyl etherification agent reacted at an arbitrary point in time to the stoichiometric amount. For example, in reaction using methyl chloride, the reacted portion of methyl chloride means the molar ratio of the amount of the methyl etherification agent reacted at this point in time to the initial amount of the alkali in a reactor because the reaction of methyl chloride consumes an equimolar amount of the alkali. Accordingly, even if the methyl etherification agent is added in the end in an amount equal to or larger than the stoichiometric amount to the alkali, the reacted portion in its calculation is irrelevant to an excess. Likewise the reacted portion of the hydroxypropyl etherification agent means the ratio of the amount of the hydroxypropyl etherification agent reacted at this point in time to the final total amount of the hydroxypropyl etherification agent added to the reactor.

The reacted portion of the methyl etherification agent or the hydroxypropyl etherification agent can be determined by a method comprising the steps of: rapidly removing and collecting the methyl etherification agent or the hydroxypropyl etherification agent from the reactor; examining the amount of the methyl etherification agent or the hydroxypropyl etherification agent remaining in the reactor at this point in time; and dividing this amount by the final amount of the methyl etherification agent or the hydroxypropyl etherification agent supposed to be added to the reactor (provided that the methyl etherification agent is based on the stoichiometric amount). It may be determined by using simulation based on a chemical kinetic equation determined by experiments.

Herein, the addition of the hydroxypropyl etherification agent to the reactor is initiated at the time when the reacted portion of the methyl etherification agent becomes preferably 5% or more, particularly preferably 10% or more.

Regarding the ratio between the addition rates of the methyl etherification agent and the hydroxypropyl etherification agent to the reactor, the molar rate ratio of the methyl etherification agent to the hydroxypropyl etherification agent is preferably 3 or more, more preferably 5 or more, particularly preferably 15 or more.

Moreover, the addition time is preferably 5 to 60 minutes for the methyl etherification agent and is preferably 20 to 80 minutes for the hydroxypropyl etherification agent. However, this addition time of 20 to 80 minutes is a time free from a lag time from the initiation of addition of the methyl etherification agent to the initiation of addition of the hydroxypropyl etherification agent.

Furthermore, the addition of the hydroxypropyl etherification agent to the reactor is desired to be initiated after preferably 0 to 70 minutes, more preferably 10 to 60 minutes, even more preferably 20 to 60 minutes, from the initiation of addition of the methyl etherification agent.

Such an addition time and addition timing can allow the addition of the hydroxypropyl etherification agent to the reactor to be initiated at the time when the reacted portion of the methyl etherification agent becomes preferably 5% or more, particularly preferably 10% or more.

Moreover, the reacted portion of the total hydroxypropyl etherification agent becomes less than 50% at the time when the reacted portion of the total methyl etherification agent is 50% or more; or the reacted portion of the total hydroxypropyl etherification agent becomes less than 30% at the time when the reacted portion of the total methyl etherification agent added is 30% or more. As a result, the hydroxypropylmethylcellulose having an average substitution degree of a methoxy group of 1.0 to 2.0 per glucose unit, an average substitution degree of a hydroxypropoxy group of 0.05 to 0.4 per glucose unit, and an A/B value of 3.05 or more can be produced wherein the A/B value is obtained by dividing A (a substitution degree of a methoxy group directly substituted for a hydroxy group on carbon at position 6 in a glucose unit free from a hydroxypropoxy group-substituted hydroxy group) by B (a substitution degree of a methoxy group per glucose unit).

The temperature of the etherification reaction may be any temperature that provides the C/D value of the present invention without particular limitations and is preferably 50 to 80° C. for the initial stage of the reaction (at the start of supply of either of the etherification agent), 50 to 80° C. after 0.5 hours, 55 to 90° C. after 1 hour, 65 to 110° C. after 1.5 hours, and 80 to 110° C. after 2 hours. The temperature is then kept at preferably 80 to 110° C. The reaction may be terminated at the completion of the etherification reaction, regardless of the schedule.

The C/D value in the etherification reaction, and production conditions other than the step of adding the methyl etherification agent and the hydroxypropyl etherification agent, used in the present invention, can adopt methods known in the art.

Hereinafter, the present invention will be described more specifically with reference to Examples and Comparative Examples. However, it should not be construed that the present invention is limited to these Examples.

Example 1

Highly pure and soluble pulps derived from wood (manufactured by Nippon Paper Industries, Co., Ltd.) were pulverized using a roller mill, then sifted through a sieve of 600 μm in aperture size, and fed at a constant rate of 10 g/min to a double-shaft kneader KRC Kneader type S1 (manufactured by Kurimoto, Ltd.; paddle diameter: 25 mm, outer diameter: 255 mm, L/D=10.2, inner volume: 0.12 L, rotation speed: 100 rpm). At the same time, an aqueous 49% by weight sodium hydroxide solution was fed at a constant rate of 13.7 g/min from an inlet at the pulp supply port to obtain alkali cellulose comprising the aqueous alkali solution added to the cellulose. Of the alkali cellulose obtained by continuous operation for approximately 30 minutes, a 561 g aliquot (230 g in terms of cellulose) was added to a pressure vessel equipped with a plowshare-type internal stirring blade. The pressure of the vessel was reduced to −97 kPa and then returned to an atmospheric pressure by the addition of nitrogen. The pressure was further reduced again to −97 kPa.

Next, 210 g of methyl chloride was added to the reactor in 30 minutes using a pressure pump. Ten minutes after the initiation of addition of methyl chloride, the addition of propylene oxide to the reactor was initiated using a pressure pump. This propylene oxide was added to the reactor in an amount of 95 g in 50 minutes. The internal temperature of the reactor started at 50 to 80° C. and was adjusted to 50 to 80° C. after 0.5 hours, 55 to 90° C. after 1 hour, 65 to 110° C. after 1.5 hours, and 80 to 110° C. after 2 hours to complete etherification reaction. In an additional experiment performed under the same conditions for sampling, the reacted portion of methyl chloride was 5% at the start of addition of propylene oxide.

Forty minutes after the initiation of addition of methyl chloride, the reacted portions were 30% for methyl chloride and 20% for propylene oxide. Sixty minutes after the initiation of addition of methyl chloride, the reacted portions were 50% for methyl chloride and 48% for propylene oxide. The ratio of an addition rate of methyl chloride to that of propylene oxide was 5.50.

The reaction product was washed with hot water of 95° C. or higher, then dried, and dried in a small Willey mill. As a result of analysis according to the analysis method of the substitution degree of hypromellose (hydroxypropylmethylcellulose) described in the Japanese Pharmacopoeia, Fifteenth Edition, the obtained hydroxypropylmethylcellulose had an average substitution degree of a methoxy group of 1.44 and an average substitution degree of a hydroxypropoxy group of 0.24. The C/D value obtained by dividing C (the average substitution degree of a hydroxypropoxy group) by D (the number of moles of the hydroxypropyl etherification agent subjected to the reaction per glucose unit of the cellulose) was 0.27.

To 50 mg of the obtained hydroxypropylmethylcellulose, 2 ml of an aqueous 3% by weight sulfuric acid solution was added for hydrolysis at 140° C. for 3 hours. Then, the hydrolysate was neutralized by the addition of approximately 0.7 g of barium carbonate. The resulting hydrolysate was dissolved and dispersed by the addition of 3 ml of methanol and centrifuged at 500 G. Then, the supernatant was filtered through a filter of 0.45 μm in aperture size. The glucose ring was reduced at 37 to 38° C. for 1 hour by the addition of 120 μl of a solution having 1.5 g of NaBH4 dissolved in 10 ml of a 0.2 N aqueous NaOH solution. After addition of 100 μl of acetic acid, the solvent was evaporated to dryness, and the residue was acetylated at 120° C. for 1.5 hours by the addition of 1 ml of pyridine and 0.5 ml of acetic anhydride. After centrifugation at 500 G, the supernatant was filtered through a filter of 0.45 μm in aperture size. The solvent was removed again, and the residue was dissolved again in 1 ml of diethylene glycol dimethyl ether. Then, a 1 μl aliquot thereof was passed through a J&W DB-5 column heated to 150 to 280° C., and the retention time of each decomposed component was measured using an FID detector. A (a substitution degree of a methoxy group directly substituted for a hydroxy group on carbon at position 6 in a glucose unit free from a hydroxypropoxy group-substituted hydroxy group) and B (an average substitution degree of a methoxy group per glucose unit of the cellulose) were determined by identification and area ratio based on peaks at which the structures of decomposed components had been identified in advance as to each detection peak using a mass spectrometer. As a result, an A/B value was calculated to be 0.307.

Thermal gel strength was determined by preparing an aqueous solution containing 10% by weight of the obtained hydroxypropylmethylcellulose; then adding the aqueous solution into a 50-ml beaker; performing thermal gelation for 40 minutes in a bath of 90° C.; measuring the maximum force required for a disc-like plunger of 20 mm in diameter to be inserted downward into the gel by 2 cm at a rate of 2 cm/min by using a rheometer manufactured by RheoTec Messtechnik GmbH; and dividing the value by the area of the disc.

Example 2

The same procedures as in Example 1 were performed except that the addition of propylene oxide to the reactor using a pressure pump was initiated 20 minutes after the initiation of addition of methyl chloride, and the total amount of propylene oxide added was adjusted such that the average substitution degree of a hydroxypropoxy group was 0.24. The results are shown in Table 1.

Example 3

The same procedures as in Example 1 were performed except that the addition of propylene oxide to the reactor using a pressure pump was initiated 30 minutes after the initiation of addition of methyl chloride, and the total amount of propylene oxide added was adjusted such that the average substitution degree of a hydroxypropoxy group was 0.24. The results are shown in Table 1.

Example 4

The same procedures as in Example 1 were performed except that propylene oxide was added over 40 minutes using a pressure pump 30 minutes after the initiation of addition of methyl chloride, and the total amount of propylene oxide added was adjusted such that the average substitution degree of a hydroxypropoxy group was 0.24. The results are shown in Table 1.

Example 5

The same procedures as in Example 1 were performed except that propylene oxide was added over 60 minutes using a pressure pump 30 minutes after the initiation of addition of methyl chloride, and the total amount of propylene oxide added was adjusted such that the average substitution degree of a hydroxypropoxy group was 0.24. The results are shown in Table 1.

Example 6

The same procedures as in Example 1 were performed except that the addition of propylene oxide was initiated simultaneously with the initiation of addition of methyl chloride, and the total amount of propylene oxide added was adjusted such that the average substitution degree of a hydroxypropoxy group was 0.24. The results are shown in Table 1.

Example 7

The same procedures as in Example 1 were performed except that the addition of propylene oxide was initiated simultaneously with the initiation of addition of methyl chloride, and the addition time of methyl chloride was set to 5 minutes. The results are shown in Table 1.

Example 8

The same procedures as in Example 1 were performed except that the addition of propylene oxide to the reactor using a pressure pump was initiated 30 minutes after the initiation of addition of methyl chloride, and the total amount of propylene oxide added was adjusted such that the average substitution degree of a hydroxypropoxy group was 0.14. The results are shown in Table 1.

Example 9

The same procedures as in Example 1 were performed except that the feed rate of the aqueous 49% by weight sodium hydroxide solution was set to 14.5 g/min in the alkali cellulose production; the amount of the alkali cellulose added to the pressure vessel equipped with a plowshare-type internal stirring blade was set to 607 g (230 g in terms of cellulose); the amount of methyl chloride added was set to 240 g; the addition of propylene oxide to the reactor using a pressure pump was initiated 30 minutes after the initiation of addition of methyl chloride; and the total amount of propylene oxide added was adjusted such that the average substitution degree of a hydroxypropoxy group was 0.10. The results are shown in Table 1.

TABLE 1

| | Example | | | | | | | | |
|---|---|---|---|---|---|---|---|---|---|
| | 1 | 2 | 3 | 4 | 5 | 6 | 7 | 8 | 9 |
| number of moles of propylene oxide per glucose unit of the hydroxypropylmethylcellulose: D | | 0.96 | 1.04 | 1.00 | 1.04 | 0.86 | 0.89 | 0.61 | 0.43 |
| time for addition of methyl chloride (minutes) | 30 | 30 | 30 | 30 | 30 | 30 | 5 | 30 | 30 |

TABLE 1-continued

| | Example | | | | | | | | |
|---|---|---|---|---|---|---|---|---|---|
| | 1 | 2 | 3 | 4 | 5 | 6 | 7 | 8 | 9 |
| time for addition of propylene oxide (minutes) | 50 | 50 | 50 | 40 | 60 | 50 | 50 | 50 | 50 |
| initiation of addition of propylene oxide (time delayed from initiation of addition of methyl chloride) (minutes) | 10 | 20 | 30 | 30 | 30 | 0 | 0 | 30 | 30 |
| reacted portion of methyl chloride at initiation of addition of propylene oxide (%) | 5 | 10 | 20 | 20 | 20 | 0 | 0 | 20 | 20 |
| reacted portion of propylene oxide at the time when the reacted portion of methyl chloride is 30% (%) | 20 | 10 | 4 | 4 | 3 | 28 | 16 | 4 | 4 |
| reacted portion of propylene oxide at the time when the reacted portion of methyl chloride is 50% (%) | 48 | 35 | 21 | 26 | 20 | 49 | 49 | 21 | 22 |
| addition rate ratio of methyl chloride to propylene oxide | 4.23 | 5.09 | 4.69 | 3.91 | 5.64 | 5.71 | 33.0 | 8.00 | 13.0 |
| average substitution degree of methoxyl group | 1.44 | 1.44 | 1.44 | 1.44 | 1.44 | 1.44 | 1.44 | 1.44 | 1.60 |
| average substitution degree of hydroxypropoxyl group (C) | 0.24 | 0.24 | 0.24 | 0.24 | 0.24 | 0.24 | 0.24 | 0.14 | 0.10 |
| weight-average degree of polymerization | 500 | 500 | 500 | 500 | 500 | 500 | 500 | 500 | 500 |
| A/B *1 | 0.307 | 0.310 | 0.317 | 0.309 | 0.316 | 0.305 | 0.306 | 0.329 | 0.350 |
| C/D *2 | 0.27 | 0.25 | 0.23 | 0.24 | 0.23 | 0.28 | 0.27 | 0.23 | 0.23 |
| thermal gelation temperature (° C.) | 66 | 68 | 70 | 67 | 69 | 65 | 66 | 67 | 68 |
| thermal gelation strength (gf/cm$^2$) | 80 | 110 | 280 | 100 | 210 | 70 | 79 | 1500 | 10000 |

*1 a value of A (a substitution degree of a methoxyl group directly substituted for a hydroxyl group on carbon at position 6 in a glucose unit free from a hydroxypropoxyl group-substituted hydroxyl group) divided by B (a substitution degree of a methoxyl group per glucose unit of cellulose).
*2 a value of C (the average substitution degree of a hydroxypropoxyl group per glucose unit of the hydroxypropylmethylcellulose) divided by D (the number of moles of the hydroxypropyl etherification agent subjected to the reaction per glucose unit of the hydroxypropylmethylcellulose).

Example 10

Freeze-dried tofu (bean curd) was prepared according to the method described in Example 1 of JP 2005-348721A using the hydroxypropylmethylcellulose selected in Example 1 as follows:

The 200 g of soybean milk powder (manufactured by Daiichi Protein Co., Ltd.), 2.0 g of sodium alginate (manufactured by Wako Pure Chemical Industries, Ltd.), 1.5 g of agar (manufactured by Ina Food Industry Co., Ltd.), and 5.0 g of the hydroxypropylmethylcellulose of Example 1 were well mixed. The 150 g of hot water was added thereto, and the mixture was stirred for 30 minutes in a boiling water bath. Subsequently, this dispersion was cooled to 15° C. or lower with stirring. The 15 g of an aqueous solution containing 6% by weight of calcium sulfate (manufactured by Wako Pure Chemical Industries, Ltd.) was added thereto as a coagulant, and the mixture was stirred and filtered through gauze. The filtrate was poured into a commercially available ice-making tray and heated for 30 minutes in a boiling water bath. This coagulated product was cooled, frozen at −40° C. for 20 hours, and then dried under vacuum to prepare freeze-dried tofu (bean curd) containing hydroxypropylmethylcellulose and agar. Hot water was added to this freeze-dried tofu (bean curd) (5×3×3 cm) containing hydroxypropylmethylcellulose and agar. As a result, the tofu maintained its shape during rehydration or during cooling after rehydration. In actual tasting, this tofu was favorably rehydrated and exhibited an excellent smooth mouthfeel like fresh silken tofu.

Example 11

Fabricated potato was prepared using the hydroxypropylmethylcellulose selected in Example 1 as follows:
The 2.5 g of the hydroxypropylmethylcellulose selected in Example 1, 3.0 g of common salt and 3.0 g of pepper were well mixed.
On the other hand, potato was peeled, then boiled, and mashed to obtain 500 g of mashed potato. The hydroxypropylmethylcellulose of Example 1 mixed with salt and pepper was added to this potato of 80° C. and well stirred until a smooth and uniform mixture was obtained.

The mixture thus stirred was divided into 30 g/piece and fabricated into an arbitrary shape to prepare fabricated potato containing hydroxypropylmethylcellulose. This fabricated potato containing hydroxypropylmethylcellulose was fried for 3 minutes in cooking oil of 180° C. As a result, the fabricated potato maintained its shape and exhibited no crack on the surface.

Comparative Example 1

Fabricated potato was prepared in the same way as in Example 11 except for hydroxypropylmethylcellulose having an average substitution degree of a methoxy group of 1.43 per glucose unit, an average substitution degree of a hydroxypropoxy group (C) of 0.23 per glucose unit, and an A/B value of 0.300 wherein the A/B value was obtained by dividing A (a substitution degree of a methoxy group directly substituted for a hydroxy group on carbon at position 6 in a glucose unit free from a hydroxypropoxy group-substituted hydroxy group) by B (a substitution degree of a methoxy group per glucose unit). This potato was fried for 3 minutes in cooking oil of 180° C. As a result, the fabricated potato exhibited cracks on the surface, though it maintained its shape.

Example 12

A custard cream filling was prepared using the hydroxypropylmethylcellulose selected in Example 1 as follows:
(Preparation of Filling)
The 0.5 g of the hydroxypropylmethylcellulose selected in Example 1 and 2.8 g of granulated sugar were well powdered and mixed. The 2.0 g of tapioca starch (manufactured by Nihon Shokuhin Kako Co., Ltd.) was dispersed in 9.0 g of water.
On the other hand, 14.0 g of granulated sugar and 9.0 g of egg yolk were added to 62.2 g of milk, and the mixture was boiled. The mixture of granulated sugar and the hydroxypropylmethylcellulose selected in Example 1 was added thereto and uniformly dispersed. The tapioca starch dispersed in water was further added thereto, and the mixture was heated with stirring for uniform dispersion. Then, 0.4 g of rum and 0.1 g of vanilla flavoring were added thereto, and the mixture was cooled to 15° C. to prepare a custard cream filling containing the hydroxypropylmethylcellulose. The water content of this custard cream filling was determined to be 27% by weight.

Herein, the water content in the custard cream filling was determined by drying a 5 g aliquot of the prepared custard cream for 2 hours in an oven of 105° C. and calculating, as water content, the weight reduced by the drying.
(Evaluation of Filling)

The 250 g of strong flour, 5 g of dry yeast, 20 g of sugar, 5 g of salt, and 20 g of shortening were mixed. A mixture of 50 g of egg and 120 g of milk was added thereto and kneaded into a uniform block. The prepared dough was divided into 50 g/piece and fermented at 35° C. until the dough was doubled in size.

The fermented dough was rolled out into oval shape, and 25 g of the custard cream filling containing the hydroxypropylmethylcellulose selected in Example 1 was placed on the central part. The dough was folded in half, and the opening was pressed for sealing to prepare a cream bun. This cream bun was placed in an oven preheated to 180° C., and baked for 20 minutes. The cream filling therein did not lie off the cream bun even after baking. The water content of the cream in the baked cream bun was determined in the same way as in Example 12 to be 26% by weight, demonstrating suppressed water evaporation from cream during baking.

Comparative Example 2

A cream bun was prepared in the same way as in Example 12 except for hydroxypropylmethylcellulose having an average substitution degree of a methoxy group of 1.43 per glucose unit, an average substitution degree of a hydroxypropoxy group (C) of 0.23 per glucose unit, and an A/B value of 0.300 wherein the A/B value was obtained by dividing A (a substitution degree of a methoxy group directly substituted for a hydroxy group on carbon at position 6 in a glucose unit free from a hydroxypropoxy group-substituted hydroxy group) by B (a substitution degree of a methoxy group per glucose unit).

This cream bun was baked for 20 minutes in an oven of 180° C. As a result, the cream filling therein did not lie off the cream bun even after baking. However, the water content of the cream in the baked cream bun was determined to be 23% by weight, demonstrating water evaporation from the cream during baking. Thus, the resulting cream offered a dry texture, compared with that prepared in Example 12.

Example 13

Gluten-free bread was prepared using the hydroxypropylmethylcellulose selected in Example 1 as follows:

The 200 g of rice flour for confectionery production (Gunmaseifun Flour Milling Co., Ltd.), 50 g of tapioca starch (Nihon Shokuhin Kako Co., Ltd.), 5.0 g of the hydroxypropylmethylcellulose selected in Example 1, 5.0 g of common salt, 20 g of sugar, 10 g of skim milk, and 17.5 g of shortening were well mixed. The 10.0 g of dry yeast dissolved in 220 g of warm water (35° C.) was added to the mixed powder and well stirred using a handheld electric mixer until the mixture became uniform. The uniform dough was poured into a mold of 8 cm long, 18 cm wide and 8 cm high and fermented using a fermenter until the dough was doubled in size. The dough thus fermented was heated for 20 minutes in an oven preheated to 210° C. The baked product was taken off the mold to prepare gluten-free bread containing the hydroxypropylmethylcellulose selected in Example 1. The baked bread had a height of 10 cm.

Comparative Example 3

Gluten-free bread was prepared in the same way as in Example 13 except for hydroxypropylmethylcellulose having an average substitution degree of a methoxy group of 1.43 per glucose unit, an average substitution degree of a hydroxypropoxy group (C) of 0.23 per glucose unit, and an A/B value of 0.300 wherein the A/B value was obtained by dividing A (a substitution degree of a methoxy group directly substituted for a hydroxy group on carbon at position 6 in a glucose unit free from a hydroxypropoxy group-substituted hydroxy group) by B (a substitution degree of a methoxy group per glucose unit).

The baked bread had a height of 8.5 cm. Due to the lower gel strength of hydroxypropylmethylcellulose than that in Example 13, the bread exhibited combined air bubbles and had a harder texture than that of the bread prepared in Example 13.

The invention claimed is:

1. A method for producing hydroxypropylmethylcellulose having an average substitution degree of a methoxy group of 1.0 to 1.6 per glucose unit, an average substitution degree of a hydroxypropoxy group (C) of 0.2 to 0.3 per glucose unit, and an A/B value of 0.305 or greater wherein A represents a substitution degree of a methoxy group directly substituted for a hydroxy group on carbon at position 6 in a glucose unit free from a hydroxypropoxy group-substituted hydroxy group, B represents a substitution degree of a methoxy group per glucose unit, and the A/B value represents a value of A divided by B, the method comprising at least the steps of:
    reacting a pulp with an alkali to obtain alkali cellulose; and
    adding a methyl etherification agent and a hydroxypropyl etherification agent to react with the alkali cellulose to obtain hydroxypropylmethylcellulose, wherein addition rates of the methyl etherification agent and the hydroxypropyl etherification agent are adjusted such that a reacted portion of the hydroxypropyl etherification agent is less than 50% at the time when a reacted portion of the methyl etherification agent is 50% or more, or such that a reacted portion of the hydroxypropyl etherification agent is less than 30% at the time when a reacted portion of the methyl etherification agent is 30% or more, and wherein the addition of the hydroxypropyl etherification agent is initiated at a time when a reacted portion of the methyl etherification agent becomes 5% or more, and after 10 to 60 minutes from the initiation of addition of the methyl etherification agent so as to obtain a C/D value of 0.28 or less wherein C represents the average substitution degree of a hydroxypropoxy group per glucose unit of the hydroxypropylmethylcellulose, D represents the number of moles of the hydroxypropyl etherification agent per glucose unit of the hydroxypropylmethylcellulose, and the C/D value represents a value of C divided by D, and wherein a molar ratio of the addition rate of the methyl etherification agent to the addition rate of the hydroxypropyl etherification agent is 3 or more, and wherein the hydroxypropylmethylcellulose has a thermal gelation temperature from 64° C. to 75° C.

2. The method for producing hydroxypropylmethylcellulose according to claim 1, wherein the average substitution degree of a methoxy group of 1.3 to 1.6 per glucose unit.

3. The method for producing hydroxypropylmethylcellulose according to claim 1, wherein the A/B value of less than 0.37.

4. The method for producing hydroxypropylmethylcellulose according to claim 1, wherein the A/B value of less than 0.35.

5. The method for producing hydroxypropylmethylcellulose according to claim 1, wherein C/D value is less than 0.26 and greater than 0.15.

6. The method for producing hydroxypropylmethylcellulose according to claim 1, wherein C/D value is greater than 0.20.

7. The method for producing hydroxypropylmethylcellulose according to claim 1, wherein the hydroxypropylmethylcellulose has a weight-average polymerization degree of 10 to 5000.

8. The method for producing hydroxypropylmethylcellulose according to claim 1, wherein the hydroxypropylmethylcellulose has a thermal gelation temperature of 66° C. to 75° C.

9. The method for producing hydroxypropylmethylcellulose according to claim 1, wherein methyl etherification agent is added such that the a reacted portion of the total amount of the hydroxypropyl etherification agent is less than 50% when the reacted portion of the total amount of methyl etherification agent is 50% or more.

10. The method for producing hydroxypropylmethylcellulose according to claim 1, wherein an addition of the hydroxypropyl etherification agent is initiated after 20 to 60 minutes from initiation of addition of the methyl etherification agent.

11. The method for producing hydroxypropylmethylcellulose according to claim 1, wherein an addition of the hydroxypropyl etherification agent is initiated at the time when a reacted portion of the methyl etherification agent becomes 10% or more.

12. The method for producing hydroxypropylmethylcellulose according to claim 1, wherein an addition of the hydroxypropyl etherification agent is initiated at the time when a reacted portion of the methyl etherification agent becomes 10% or more, and after 20 to 60 minutes from initiation of addition of the methyl etherification agent.

13. The method for producing hydroxypropylmethylcellulose according to claim 1, wherein a molar ratio of the addition rate of the methyl etherification agent to the addition rate of the hydroxypropyl etherification agent is 5 or more.

14. The method for producing hydroxypropylmethylcellulose according to claim 1, wherein a molar ratio of the addition rate of the methyl etherification agent to the addition rate of the hydroxypropyl etherification agent is 15 or more.

15. The method for producing hydroxypropylmethylcellulose according to claim 1, wherein a reaction of the methyl etherification agent with the alkali cellulose and a reaction of the hydroxypropyl etherification agent with the alkali cellulose is competing.

* * * * *